United States Patent [19]

Park

[11] Patent Number: 4,843,678
[45] Date of Patent: Jul. 4, 1989

[54] CASTER PAD

[75] Inventor: Pong K. Park, Clifton, N.J.

[73] Assignee: Southgate Corporation, Newark, N.J.

[21] Appl. No.: 216,135

[22] Filed: Jul. 7, 1988

[51] Int. Cl.⁴ .............................................. B60B 33/00
[52] U.S. Cl. .......................................... 16/30; 16/29
[58] Field of Search ...................... 16/30, 29, 31 R, 43

[56] References Cited

U.S. PATENT DOCUMENTS 3,667,085  6/1972  Cumella et al. .......................... 16/30
4,227,281 10/1980  Chung et al. ........................ 16/30 X Primary Examiner—Nicholas P. Godici
Assistant Examiner—Carmine Cuda
Attorney, Agent, or Firm—Thomas H. Whaley

[57] ABSTRACT

A novel caster pad attachable to the bottom of a receptacle and adapted to receive and hold a replaceable caster assembly has a rectangular base with a flange at each of its four edges. A pair of opposite flanges have a hole near each end of the opposite flanges, the holes in one flange being in alignment with the holes in the opposite flange. A U-shaped rod has arms which can enter the holes of one flange and extend out of the holes of the opposite flange so that the plate of a caster assembly can be captured between the base of the caster pad and the arms of the U-shaped rod. Locking devices are applied to the end of one or both arms to lock the U-shaped rod in place with its arms extending through the aligned holes.

2 Claims, 1 Drawing Sheet

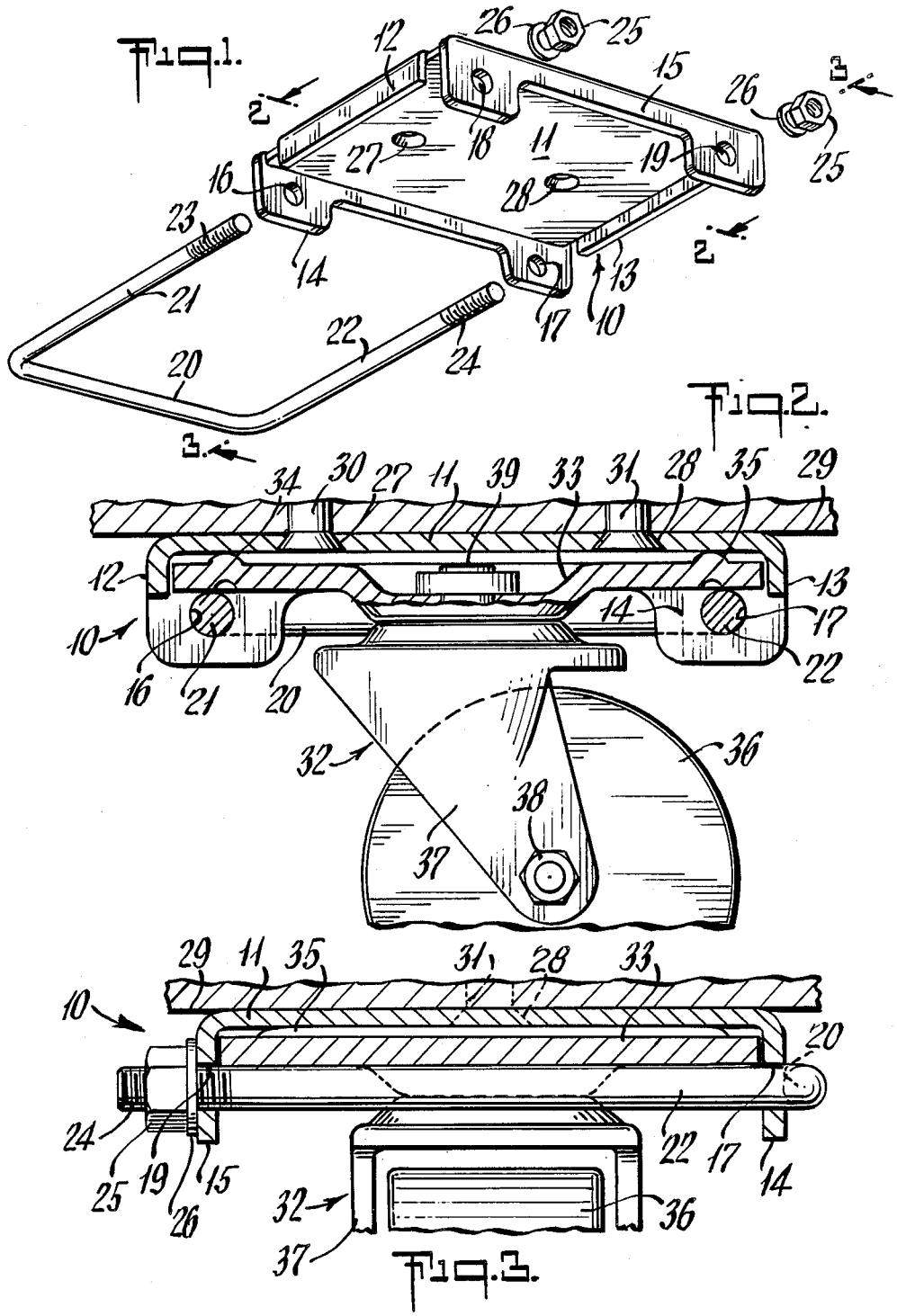

4,843,678

CASTER PAD

BACKGROUND OF THE INVENTION

This invention relates to a device for holding a roller or caster at the bottom of a container or receptacle. More particularly, the device is a caster pad in the form of (1) a plate with its edges bent at right angles to its central portion which is attached to the bottom of the container, and (2) a bolt-like member which cooperates with the edges of the plate to hold firmly a replaceable roller or caster assembly.

Caster pads are used under bins and receptacles of various types, e.g., trash containers employed by hospitals and supermarkets. Illustrative of prior proposals for caster pads is U.S. Pat. No. 3,667,085 to Cumella et al and U.S. Pat. No. 4,227,281 to Chung et al. The caster pad involves the double bending of one edge to form a shelf below the pad for the support of one edge of a replaceable caster unit while a special bolt passes through two bent-down edges of the pad to capture the edge of the caster unit opposite the edge resting on the shelf. Chung et al eliminate the special bolt of Cumella et al but the caster pad now requires two opposed edges to be doubly bent to form shelves. A U-shaped spring has its two legs inserted into the two shelves of the caster pad to retain a caster unit against the caster pad. Otherwise, Chung et al propose a caster pad with a single shelf-like edge but in this design two bolts are required but these are prone to bending and other damage during rough usage of the container to which the caster pad is attached.

A principal object of this invention is to provide an improved caster pad that is easy to produce and resistant to damage.

A further important object is to reduce the cost of manufacturing the caster pad by minimizing the amount of metal required to form the pad and by employing simple production procedures.

Other features and advantages of the invention will be apparent from the description which follows.

SUMMARY OF THE INVENTION

In accordance with this invention, a caster pad that is usually permanently affixed to the bottom of a container and is designed for the facile attachment of a replaceable caster unit comprises a rectangular base large enough to receive the caster unit, a flange along each of the four edges of the base, a hole near each end of one flange, a hole near each end of the opposite flange, the two holes of one flange being substantially aligned with the two holes of the opposite flange, and a U-shaped rod dimensioned so that the two sides of the U-shaped rod pass through the aligned holes, the two ends of the U-shaped rod being threaded to receive nuts which lock the rod in place.

The manufacture of this caster rod not only reduces the amount of waste metal but also involves such simple procedures as metal punching, beading and threading. Moreover, the novel caster pad is resistant to damage from heavy usage and facilitates the replacement of a damaged caster unit.

BRIEF DESCRIPTION OF THE DRAWINGS

For a fuller understanding of the invention, the further description will refer to the accompanying drawings of which:

FIG. 1 is an exploded perspective view of a preferred embodiment of the caster pad of this invention;

FIG. 2 is a sectional view of the caster pad of FIG. 1 taken along the line 2—2, together with a partial view of a caster unit held by the caster pad; and FIG. 3 is a sectional view of the caster pad of FIG. 1 taken along the line 3—3, together with a partial view of a caster unit held by the caster pad.

DESCRIPTION OF THE PREFERRED EMBODIMENT

The caster pad 10 of FIG. 1 has base 11, two side flanges 12,13 two end flanges 14,15, two widely spaced holes 16,17 in end flange 14, and two widely spaced holes 18,19 in end flange 15. Holes 16,18 are substantially in alignment as are also holes 17,19. The locking mechanism for holding a caster or roller unit in pad 10 firmly against base 11 is U-shaped rod 20 with substantially parallel arms 21,22 having a length to extend through opposite holes 16,18 and holes 17,19. Arms 21,22 have threaded ends 23,24, respectively, and a nut 25 is provided for each of ends 23,24 to complete the locking mechanism. Preferably, a washer 26, especially of the lock-type, is included for each of ends 23,24.

Two holes 27,28 in base 11 facilitate the attachment of caster pad 10 to the bottom of container or receptacle with screws, bolts or rivets. End flanges 14,15 are wider than side flanges 12,13 to accommodate holes 16,17,18,19. However, the portions of end flanges 14,15 between holes 16,17 and between holes 18,19, respectively, may be cut down, as shown, to approximately the width of side flanges 12,13, and may even be cut down to base 11 so that end flanges 14,15, in such case, do not extend fully along the ends of base 11; only the portions of flanges 14,15 with holes 16,17,18,19 remain and suffice to hold a caster unit when U-shaped rod 20 is inserted with its arms 21,22 passing through aligned holes 16,18 and holes 17,19.

FIGS. 2 and 3 show caster pad 10 fastened to the bottom 29 of a receptacle by screws 30,31. Caster assembly or unit 32 has its plate 33 with two linear indents 34,35 held firmly against base 11 of pad 10 by U-shaped rod 20, arms 21,22 of which were passed through holes 16,17 and holes 18,19, respectively. Nuts 25 and washers 26 applied to threaded ends 23,24 prevent arms 21,22 from slipping out of holes 18,19. While U-shaped rod 20 is shown with its arms 21,22 inserted in holes 16,17, the position of arms 21,22 relative to holes 16,17 can be reversed. In fact, arms 21,22 can first enter holes 18,19 in either order before passing through holes 16,17.

Caster pad 10 will hold any conventional caster assembly or unit 32 sold in commerce. Inasmuch as unit 32 is not part of this invention, there is no need to describe its various forms. Illustrative caster unit 32 shown in FIGS. 2 and 3 has wheel 36 rotatably held in yoke 37 by bolt 38. In turn, yoke 37 is attached by king pin 39 to plate 33 so that yoke 37 can swivel.

It is evident from the foregoing description and accompanying drawings that the caster pad of this invention is the quintessence of simplicity both in structure and in means for retaining a replaceable caster unit therein. Variations and modifications of the invention will be apparent to those skilled in the art without departing from the spirit or scope of the invention. For instance, side flanges 12,13 need not be coextensive with the edges of base 11 but may be segmented in the form of two or more spaced tabs. Similarly, each of end flanges 14,15 can be a pair of tabs with holes 16,17 and a pair of tabs with holes 18,19, respectively. Also, threaded ends 23,24 may be replaced by other means to prevent them from slipping out of holes 18,19. For example, the ends of arms 21,22 may each have a diametrical hole for the reception of a cotter pin. In fact, if U-shaped rod 20 is rigid enough, a threaded end on only one arm and one nut will suffice to keep U-shaped rod 20 securely locked into caster pad 10. The same can be accomplished with a hole in the end of only one arm and a single cotter pin. Accordingly, only such limitations should be imposed on the invention as set forth in the appended claims.

I claim:

1. A caster pad attachable to the bottom of a container for the facile mounting and removal of a caster unit having a caster plate, which comprises a rectangular base dimensioned so that said caster plate can be placed thereagainst, a pair of side flanges at the opposite side edges of said base, a pair of end flanges at the opposite end edges of said base, both of said side flanges and both of said end flanges being integral extensions of said base which have been bent at right angles to said base, each of said end flanges having an opening therethrough adjacent each end of said end flanges, wherein each of the openings of one of said end flanges is in substantial alignment with a corresponding opening of the other of said end flanges, a U-shaped rod having substantially parallel arms capable of fitting through said openings of one of said end flanges and of extending through the corresponding openings of the other of said end flanges, and means for securing the end of at least one of said arms to prevent said rod from slipping out of said corresponding openings through which said rod extends.

2. The caster pad of claim 1 wherein the arms of the U-shaped rod have threaded ends and nuts therefor as the means to prevent said ends from slipping out of the openings through which said ends extend.

* * * * *